United States Patent
Madruga et al.

(10) Patent No.: US 12,423,928 B2
(45) Date of Patent: Sep. 23, 2025

(54) AUTO-GENERATING AN ARTIFICIAL REALITY ENVIRONMENT BASED ON ACCESS TO PERSONAL USER CONTENT

(71) Applicant: Meta Platforms Technologies, LLC, Menlo Park, CA (US)

(72) Inventors: Tiffany Madruga, New York, NY (US); Allison Fu, San Francisco, CA (US); Meaghan Fitzgerald, Seattle, WA (US); Geeti Arora, San Ramon, CA (US); Rachel Cross, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/614,273

(22) Filed: Mar. 22, 2024

(65) Prior Publication Data
US 2024/0312156 A1    Sep. 19, 2024

Related U.S. Application Data

(63) Continuation of application No. 18/310,469, filed on May 1, 2023, now Pat. No. 11,941,769, which is a (Continued)

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS

| 8,767,016 B2 | 7/2014 | Yang |
| 9,857,939 B2 | 1/2018 | Webb et al. |

(Continued)

FOREIGN PATENT DOCUMENTS

| KR | 20150004494 A | 1/2015 |

OTHER PUBLICATIONS

Jeremy., "The Codex," Oct. 14, 2019, 3 pages, Retrieved from the Internet: URL: https://help.sansar.com/hc/en-us/articles/360032834532-The-Codex.

(Continued)

*Primary Examiner* — Jwalant Amin
(74) *Attorney, Agent, or Firm* — lMorgan, Lewis & Bockius LLP

(57) ABSTRACT

Methods, systems, and storage media for auto-generating an artificial reality environment based on access to personal user content are disclosed. Exemplary implementations may: receive consent from a user to access user content on a user device, the user content comprising digital media; generate a user profile based at least in part on the user content; determine user preferences based at least in part on the user profile; generate an artificial reality environment based at least in part on the user preferences; and share the artificial reality environment with contacts of the user.

20 Claims, 8 Drawing Sheets

Related U.S. Application Data continuation of application No. 17/498,540, filed on Oct. 11, 2021, now Pat. No. 11,670,060.

(51) Int. Cl.
  *G06F 3/01* (2006.01)
  *G06F 3/04815* (2022.01)
  *G06Q 50/00* (2012.01)

(52) U.S. Cl.
  CPC .............. *G06F 3/012* (2013.01); *G06F 3/013* (2013.01); *G06F 3/015* (2013.01); *G06F 3/016* (2013.01); *G06F 3/04815* (2013.01); *G06Q 50/01* (2013.01)

(56) References Cited

U.S. PATENT DOCUMENTS

| | | |
|---|---|---|
| 10,599,758 B1 | 3/2020 | Yu et al. |
| 10,867,446 B2 | 12/2020 | Khalid et al. |
| 10,885,091 B1 | 1/2021 | Meng et al. |
| 11,562,550 B1* | 1/2023 | Asghar ................. G02B 27/017 |
| 12,094,045 B2* | 9/2024 | Mandel .................... G06N 5/04 |
| 2012/0327119 A1 | 12/2012 | Woo et al. |
| 2013/0332521 A1 | 12/2013 | Olague et al. |
| 2014/0040783 A1 | 2/2014 | Goldman et al. |
| 2014/0181115 A1 | 6/2014 | Chen et al. |
| 2015/0254723 A1 | 9/2015 | Chand et al. |
| 2016/0155187 A1 | 6/2016 | Paulrajan et al. |
| 2016/0371768 A1 | 12/2016 | Crow |
| 2019/0147760 A1 | 5/2019 | Bruckner et al. |
| 2019/0266471 A1 | 8/2019 | Rakshit |
| 2019/0313059 A1* | 10/2019 | Agarawala .............. G06F 3/011 |
| 2019/0385243 A1 | 12/2019 | Childers et al. |
| 2021/0266637 A1* | 8/2021 | Punja .................. H04N 21/4667 |
| 2021/0271707 A1* | 9/2021 | Lin ........................ G06F 40/216 |
| 2022/0004889 A1 | 1/2022 | Atkinson, III et al. |
| 2022/0156998 A1* | 5/2022 | Lee ......................... G06N 20/00 |
| 2022/0276879 A1* | 9/2022 | Rajagopal ........... G06F 16/9537 |

OTHER PUBLICATIONS

"National Geographic Explorer Oculus Quest Machu Picchu Gameplay," BMFVR, YouTube, Nov. 26, 2019, 5 pages, Retrieved from the Internet: URL: https://www.youtube.com/watch?v=Yh0h42GPqb4.

"Oculus Introduces New Ways to Play Together," Oculus Blog, Jul. 20, 2020, 5 pages, Retrieved from the Internet: URL: https://www.oculus.com/blog/oculus-introduces-new-ways-to-play-together/.

"Rebuilt From Memories—A Virtual Reality Project on Life in Aleppo Before the War by Arthelps and Jung Von Matt on GoSee," GoSeeMag, Jul. 2021 [retrieved on Jul. 26, 2021], 13 pages, Retrieved from the Internet: URL: https://fashionfanzine.com/newsticker/rebuilt-from-memories-a-virtual-reality-project-on-life-inaleppo-before-the-war-by-arthelps-and-jung-von-matt-ongosee/.

Takahashi D., "Sansar Gets Revamped with Avatar Editor, a New Core World, and Corporate Partnerships," Venture Beat, Sep. 24, 2019, 7 pages, Retrieved from the Internet: URL: https://venturebeat.com/2019/09/24/sansar-reimagined-with-avatar-editor-a-new-core-world-and-corporate-partnerships/.

VR Is Not Only About Gaming—10 Other Awesome Things You Can Do in VR, Cas and Chary VR, YouTube, Apr. 26, 2019, 6 pages, Retrieved from the Internet: URL: https://www.youtube.com/watch?v=KecTUGt-ATA.

* cited by examiner

AUTO-GENERATING AN ARTIFICIAL REALITY ENVIRONMENT BASED ON ACCESS TO PERSONAL USER CONTENT

CROSS REFERENCE TO RELATED APPLICATIONS

This present application claims the benefit of priority under 35 U.S.C. § 120 as a continuation of U.S. patent application Ser. No. 18/310,469, filed May 1, 2023, now allowed, which is a continuation of U.S. patent application Ser. No. 17/498,540, filed Oct. 11, 2021, now U.S. Pat. No. 11,670,060, issued Jun. 6, 2023, each of which is incorporated by reference in its entirety.

TECHNICAL FIELD

The present disclosure generally relates to generating an artificial reality environment, and more particularly to auto-generating an artificial reality environment based on access to personal user content.

BACKGROUND

Conventionally, artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality.

BRIEF SUMMARY

The subject disclosure provides for systems and methods for generating an artificial reality environment. A user is allowed to experience artificial reality environments that are relevant to and customized based on various context about their lives. For example, a custom artificial reality environment may be autogenerated which is themed based on the user's personal information and experienceable by the user and one or more contacts of the user.

One aspect of the present disclosure relates to a method for generating an artificial reality environment. The method may include receiving consent from a user to access user content on a user device. The user content may include digital media. The method may include generating a user profile based at least in part on the user content. The method may include determining user preferences based at least in part on the user profile. The method may include generating an artificial reality environment based at least in part on the user preferences. The method may include sharing the artificial reality environment with contacts of the user.

Another aspect of the present disclosure relates to a system configured for generating an artificial reality environment. The system may include one or more hardware processors configured by machine-readable instructions. The processor(s) may be configured to receive consent from a user to access user content on a user device. The user content may include digital media. The digital media may include one or more of photos, videos, messages, emails, calendar, social media posts, and/or activities. The processor(s) may be configured to generate a user profile based at least in part on the user content. The processor(s) may be configured to determine user preferences based at least in part on the user profile. The processor(s) may be configured to generate an artificial reality environment based at least in part on the user preferences. The user profile may be generated through accessing the user content. The processor(s) may be configured to share the artificial reality environment with contacts of the user.

Yet another aspect of the present disclosure relates to a non-transient computer-readable storage medium having instructions embodied thereon, the instructions being executable by one or more processors to perform a method for generating an artificial reality environment. The method may include receiving consent from a user to access user content on a user device. The user content may include digital media. The digital media may include one or more of photos, videos, messages, emails, calendar, social media posts, and/or activities. The method may include generating a user profile based at least in part on the user content. The method may include determining user preferences based at least in part on the user profile. The method may include generating an artificial reality environment based at least in part on the user preferences. The user profile may be generated through accessing the user content. The user preferences may relate to one or more of food preferences, music preferences, travelling preferences, favorite places visited, preferences for specific types of activities, and/or preferences associated with contacts. The method may include sharing the artificial reality environment with contacts of the user.

Still another aspect of the present disclosure relates to a system configured for generating an artificial reality environment. The system may include means for receiving consent from a user to access user content on a user device. The user content may include digital media. The system may include means for generating a user profile based at least in part on the user content. The system may include means for determining user preferences based at least in part on the user profile. The system may include means for generating an artificial reality environment based at least in part on the user preferences. The system may include means for sharing the artificial reality environment with contacts of the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
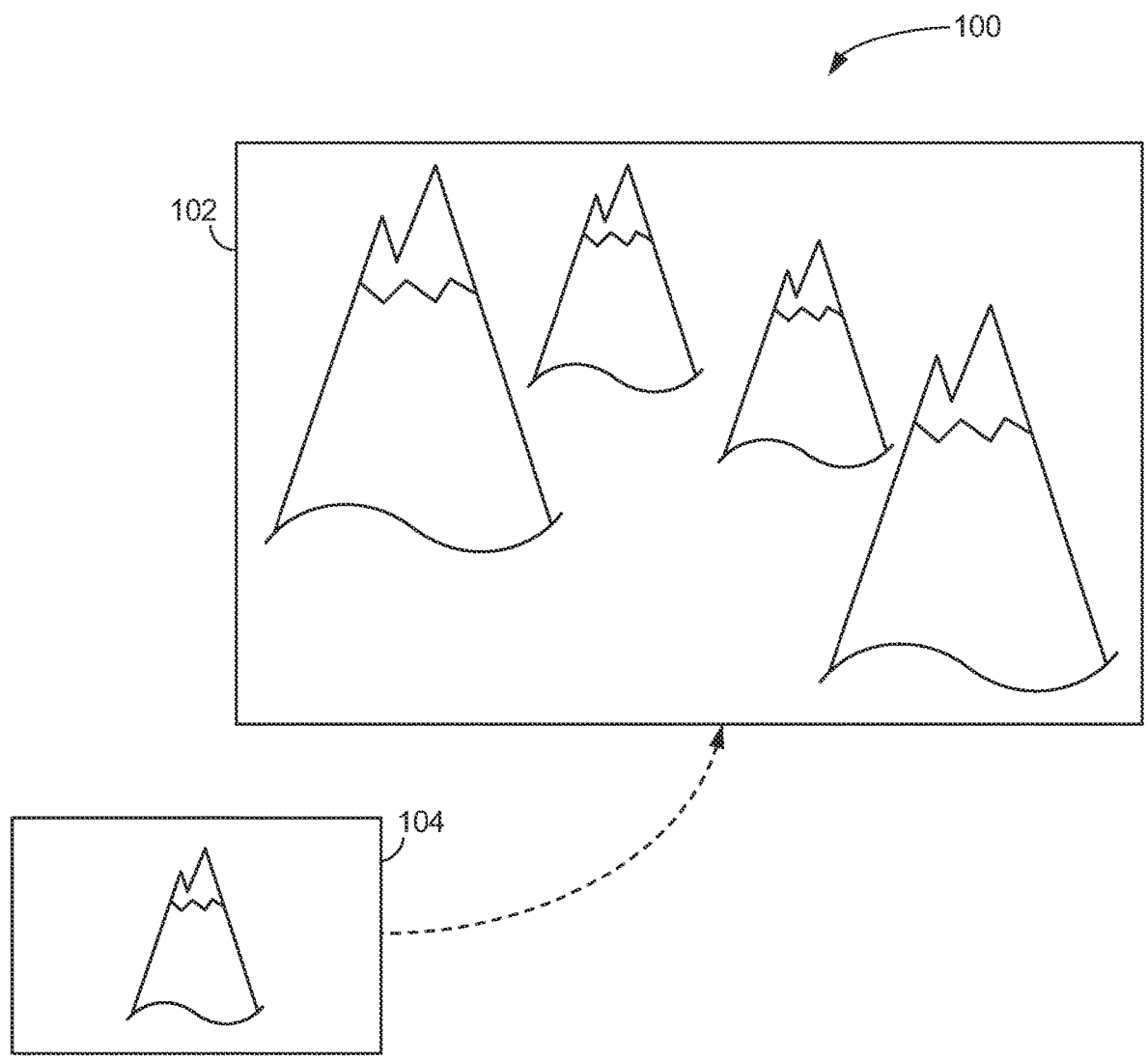
FIG. 1 illustrates an exemplary artificial reality environment in which an immersive virtual world is autogenerated based on a user photo, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Conventional artificial reality environments (e.g., augmented reality, virtual reality, mixed reality, etc.) are typically rendered in the same way for all users, thus ignoring personal preferences of individual users. Since user engagement with artificial reality environments may depend in part on enticing individual users to initially use and continue using the artificial reality environments, artificial reality environments aiming at a generic "average" user may fail to optimize actual user engagement.

The subject disclosure provides for systems and methods for generating an artificial reality environment. A user is allowed to experience artificial reality environments that are relevant to and customized based on various context about their lives. For example, a custom artificial reality environment may be autogenerated which is themed based on the user's personal information and experienceable by the user and one or more contacts of the user.

Implementations described herein address the aforementioned shortcomings and other shortcomings by automatically building a plurality of artificial reality environments customized for individual users based on one or more of past photos, experiences, relationships, shared experiences, and/or other context around their lives and preferences. Exemplary implementations may include an "on this day" feature that simulates a previous day in a user's life in an autogenerated artificial reality environment. Some implementations may provide a "mind palaces" feature through which individual users can organize thoughts, ideas, and/or concepts by way of different autogenerated artificial reality environments. According to various implementations, a given autogenerated artificial reality environment may be accessible only to the user(s) associated with the given artificial reality environment. In some implementations, the given autogenerated artificial reality environment may be shared with other specific users, suggested to close contacts and/or followers, and/or made publicly available.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, an MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

FIG. 1 illustrates an exemplary artificial reality environment 100 in which an immersive virtual world 102 is autogenerated based on a user photo 104, according to certain aspects of the disclosure. The user photo 104 may be included in or obtained from one or more of a user gallery, a social media post, a hyperlink, a camera device feed, any web sources (e.g., such as a picture of a famous painting or location), and/or other sources for photos. Additionally, analog photo sources may include books, catalogs, posters, and the like. For example, a photograph of a picture from a book may be utilized. According to some implementations, subject matter of user photo 104 (e.g., a mountain scene) may be automatically determined. For example, machine learning (ML) models (e.g., for hair segmentation) and/or real-world AR effects analysis may be utilized to automatically determine the subject matter. Additionally, the subject matter can be automatically determined using AI/ML models (e.g., existing face recognition software, a reverse image search, INSTAGRAM LENS, etc.) to identify what the image is of and the atmosphere (e.g., is the photo dark and gloomy or warm and bright?) Based on the identified subject matter, the immersive virtual world 102 may be autogenerated such that it includes or is themed from the subject matter of user photo 104 (e.g., an explorable, mountainous virtual world).

According to aspects, auto generation of the world may include utilizing a ML model to identify what the photo is. An image search may then be executed on a very large dataset to pick photos that have a similar object in it. For example, the ML model may look for images that have a mountain in it. Themes are then identified from those images, such as mountain climbing, camping, skiing, driving, etc. A recommendation engine may then determine which theme should be prioritized (e.g., based on user profile/user behavior). Additionally, neural style transfer may be utilized to apply the style, atmosphere, and/or any patterns of the photo to an interactive world. Furthermore, objects identified from the photo (an example could be a birthday cake from a birthday photo) may be generated as a 3D model and placed into the world.

Figure 2:
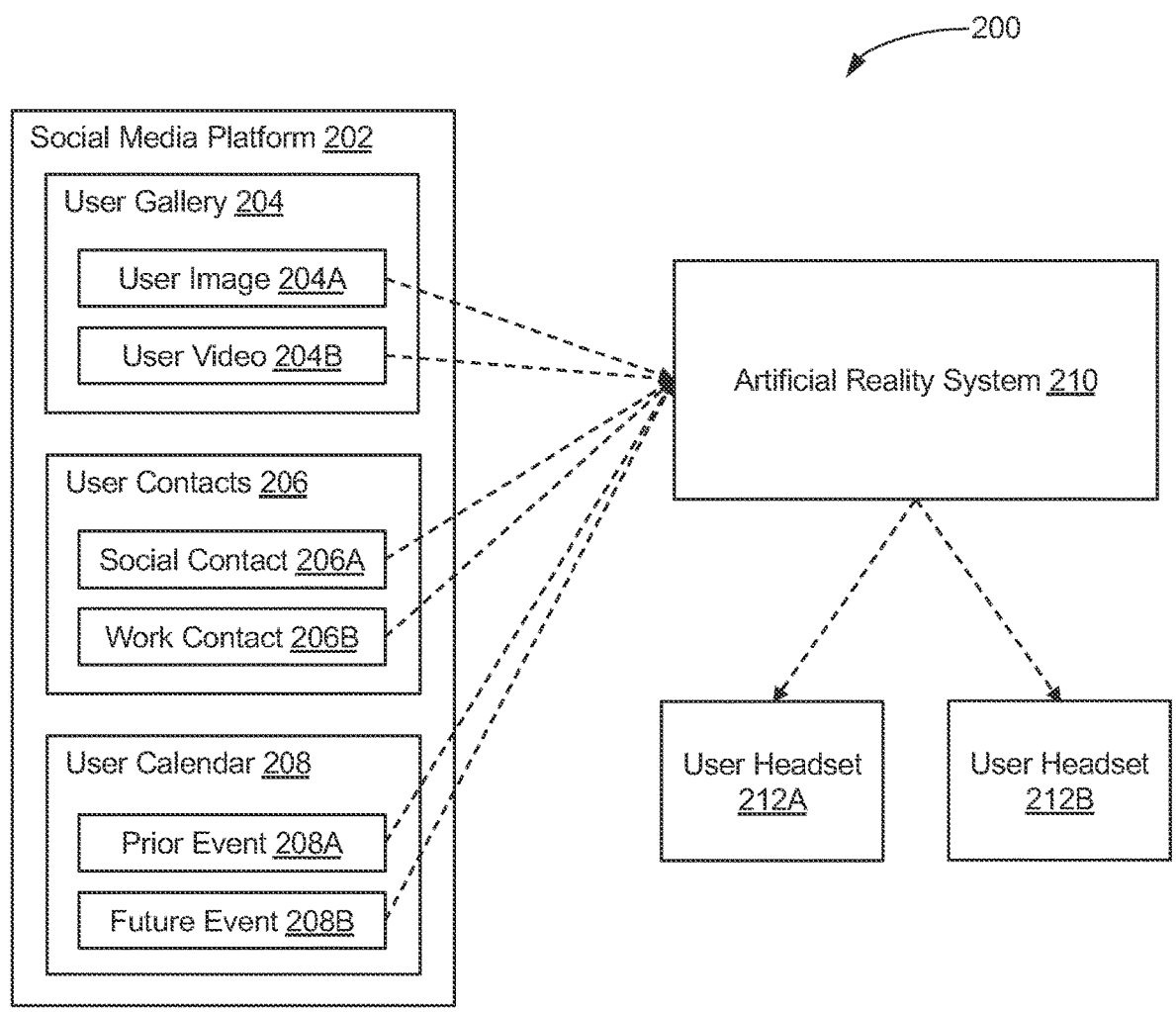
FIG. 2 illustrates an example system configured for generating an artificial reality environment based on access to personal user content, according to certain aspects of the disclosure.

FIG. 2 illustrates an example system 200 configured for generating an artificial reality environment based on access to personal user content, according to certain aspects of the disclosure. As depicted, system 200 may include social media platform 202 and/or other components. The social media platform 202 may include and/or be configured to access user gallery 204, user contacts 206, user calendar 208, and/or other components, which may be associated with a specific user and/or a specific user profile. The user gallery 204 may include one or more photos (e.g., user photo 204A), one or more videos (e.g., user video 204B), and/or other media associated with a given user. The user contacts 206 may include one or more contacts (e.g., social contact 206A and work contact 206B) from social media platform 202, a different social media platform (not depicted), a user device (not depicted), and/or other sources for contacts of the user. The user calendar 208 may include one or more past and/or future events and/or appointments (e.g., prior event 208A and future event 208B) scheduled for the user from social media platform 202, a different social media platform (not depicted), a user device (not depicted), and/or other sources for calendar information of the user.

An artificial reality system 210 may utilize information from one or more of user gallery 204, user contacts 206, user calendar 208, and/or other sources to autogenerate a custom artificial reality environment, which can then be viewed via one or more user headsets (e.g., user headsets 212A and 212B). By way of non-limiting illustration, user image 204A may include a photo from Rome; user video 204B may include a video from Venice; social contact 206A may include Friend A; work contact 206B may include co-worker B; prior event 208A may include eating at Restaurant C, which serves Italian food, with co-worker B; and future event 208B may include a vacation to Italy with Friend A. With this information, artificial reality system 210 may autogenerate an artificial reality environment in which the user and Friend A can simulate dining together at Restaurant C.

According to aspects, a user may take a picture from a 4th grade history book on Egypt. From there, the user may obtain pictures of an Egyptian landscape, palace, pharaoh, priest, etc. Text may be included that provides further details on the roles and/or lifestyle of the subjects of the obtained pictures. In an implementation, pictures may be generated from text using generative adversarial networks (GANs). Similarly, a virtual environment may be generated based on the text/pictures in the book. From there, the user's picture/avatar may be customized (e.g., clothes/accessories) to fit in and interact with that virtual environment.

According to aspects, audio may also be used in the AR environment. Audio inputs such as audio from videos and music may be used to generate the world. For example, in the above, the sounds from the restaurant (e.g., ambient noise or live music) or the canals in Venice could be used to make the AR environment richer.

Figure 3:
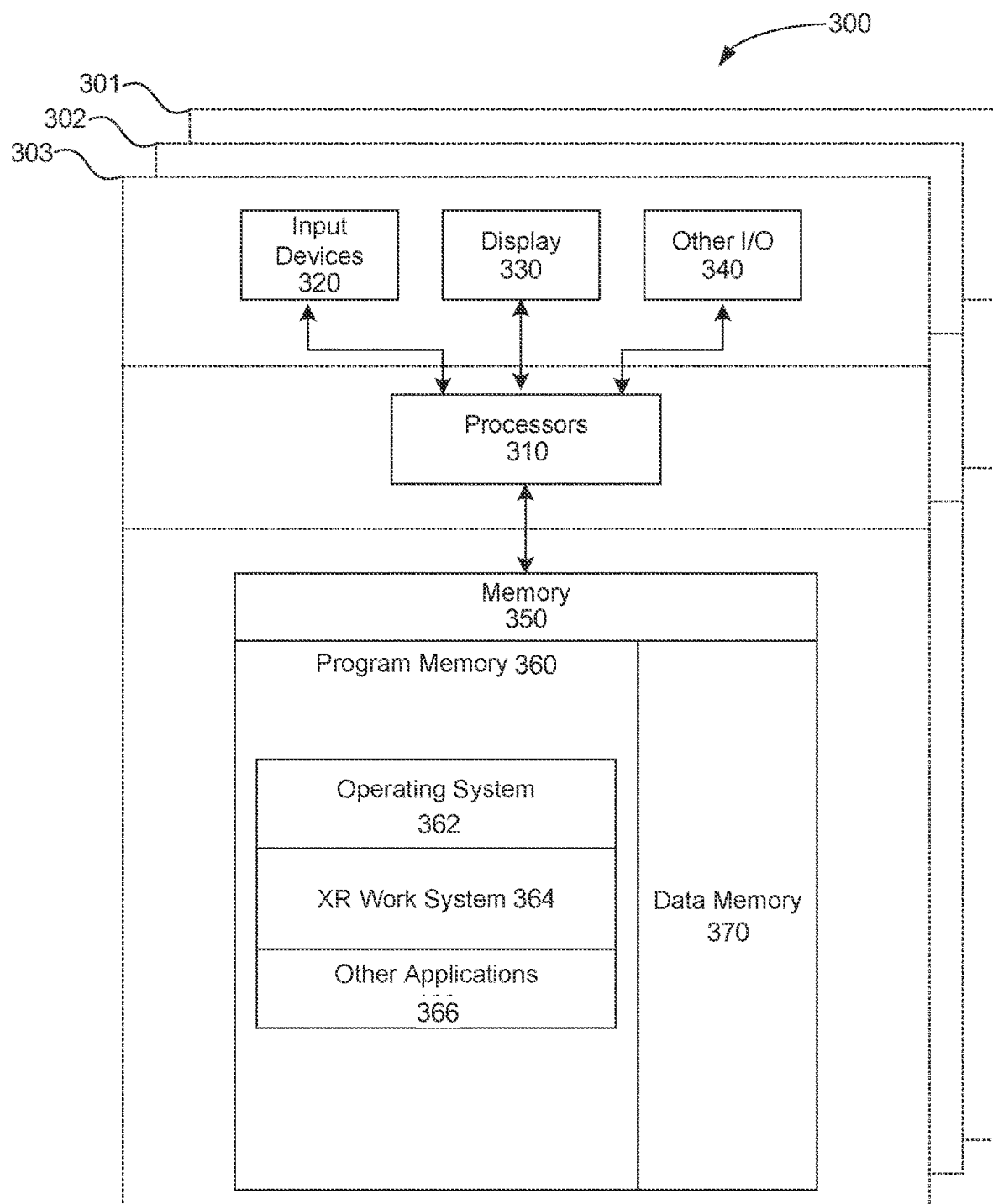
FIG. 3 is a block diagram illustrating an overview of devices on which some implementations of the disclosed technology can operate.

FIG. 3 is a block diagram illustrating an overview of devices on which some implementations of the disclosed technology can operate. The devices can comprise hardware components of a computing system 300 that can create, administer, and provide interaction modes for an artificial reality collaborative working environment. In various implementations, computing system 300 can include a single computing device 303 or multiple computing devices (e.g., computing device 301, computing device 302, and computing device 303) that communicate over wired or wireless channels to distribute processing and share input data. In some implementations, computing system 300 can include a stand-alone headset capable of providing a computer created or augmented experience for a user without the need for external processing or sensors. In other implementations, computing system 300 can include multiple computing devices such as a headset and a core processing component (such as a console, mobile device, or server system) where some processing operations are performed on the headset and others are offloaded to the core processing component. Example headsets are described below in relation to FIGS. 4A and 4B. In some implementations, position and environment data can be gathered only by sensors incorporated in the headset device, while in other implementations one or more of the non-headset computing devices can include sensor components that can track environment or position data.

Computing system 300 can include one or more processor(s) 310 (e.g., central processing units (CPUs), graphical processing units (GPUs), and holographic processing units (HPUs), etc.). Processors 310 can be a single processing unit or multiple processing units in a device or distributed across multiple devices (e.g., distributed across two or more of computing devices 301-303).

Computing system 300 can include one or more input devices 320 that provide input to the processors 310, notifying them of actions. The actions can be mediated by a hardware controller that interprets the signals received from the input device and communicates the information to the processors 310 using a communication protocol. Each input device 320 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 310 can be coupled to other hardware devices, for example, with the use of an internal or external bus, such as a PCI bus, SCSI bus, or wireless connection. The processors 310 can communicate with a hardware controller for devices, such as for a display 330. Display 330 can be used to display text and graphics. In some implementations, display 330 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 340 can also be coupled to the processor, such as a network chip or card, video chip or card, audio chip or card, USB, firewire or other external device, camera, printer, speakers, CD-ROM drive, DVD drive, disk drive, etc.

Computing system 300 can include a communication device capable of communicating wirelessly or wire-based with other local computing devices or a network node. The communication device can communicate with another device or a server through a network using, for example, TCP/IP protocols. Computing system 300 can utilize the communication device to distribute operations across multiple network devices.

The processors 310 can have access to a memory 350, which can be contained on one of the computing devices of computing system 300 or can be distributed across one of the multiple computing devices of computing system 300 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 350 can include program memory 360 that stores programs and software, such as an operating system 362, XR work system 364, and other application programs 366. Memory 350 can also include data memory 370 that can include information to be provided to the program memory 360 or any element of the computing system 300.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4A:
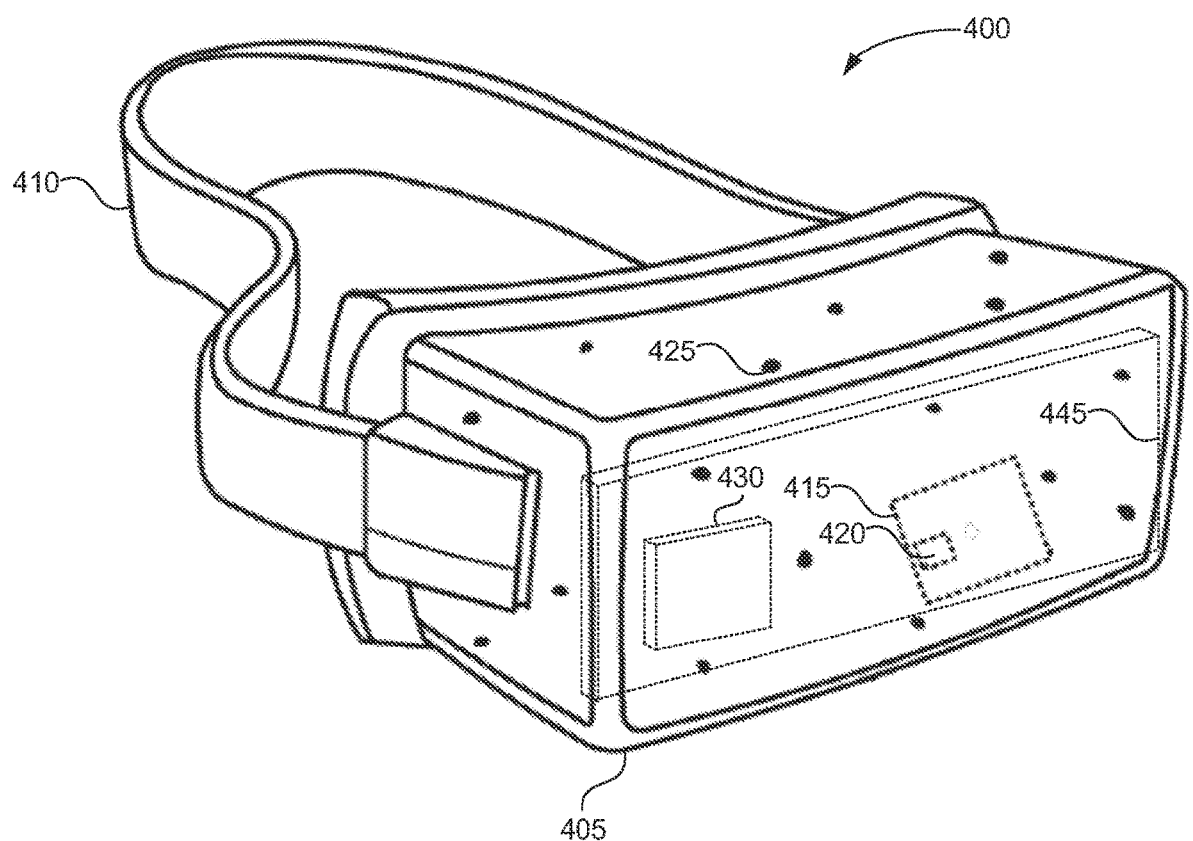
FIG. 4A is a wire diagram of a virtual reality head-mounted display (HMD), according to certain aspects of the disclosure.

FIG. 4A is a wire diagram of a virtual reality head-mounted display (HMD) 400, according to certain aspects of the disclosure. The HMD 400 includes a front rigid body 405 and a band 410. The front rigid body 405 includes one or more electronic display elements of an electronic display 445, an inertial motion unit (IMU) 415, one or more position sensors 420, locators 425, and one or more compute units 430. The position sensors 420, the IMU 415, and compute units 430 may be internal to the HMD 400 and may not be visible to the user. In various implementations, the IMU 415, position sensors 420, and locators 425 can track movement and location of the HMD 400 in the real world and in a virtual environment in three degrees of freedom (3DoF) or six degrees of freedom (6DoF). For example, the locators 425 can emit infrared light beams which create light points on real objects around the HMD 400. As another example, the IMU 415 can include e.g., one or more accelerometers, gyroscopes, magnetometers, other non-camera-based position, force, or orientation sensors, or combinations thereof. One or more cameras (not shown) integrated with the HMD 400 can detect the light points. Compute units 430 in the HMD 400 can use the detected light points to extrapolate position and movement of the HMD 400 as well as to identify the shape and position of the real objects surrounding the HMD 400.

The electronic display 445 can be integrated with the front rigid body 405 and can provide image light to a user as dictated by the compute units 430. In various embodiments, the electronic display 445 can be a single electronic display or multiple electronic displays (e.g., a display for each user eye). Examples of the electronic display 445 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 400 can be coupled to a core processing component such as a personal computer (PC) (not shown) and/or one or more external sensors (not shown). The external sensors can monitor the HMD 400 (e.g., via light emitted from the HMD 400) which the PC can use, in combination with output from the IMU 415 and position sensors 420, to determine the location and movement of the HMD 400.

Figure 4B:
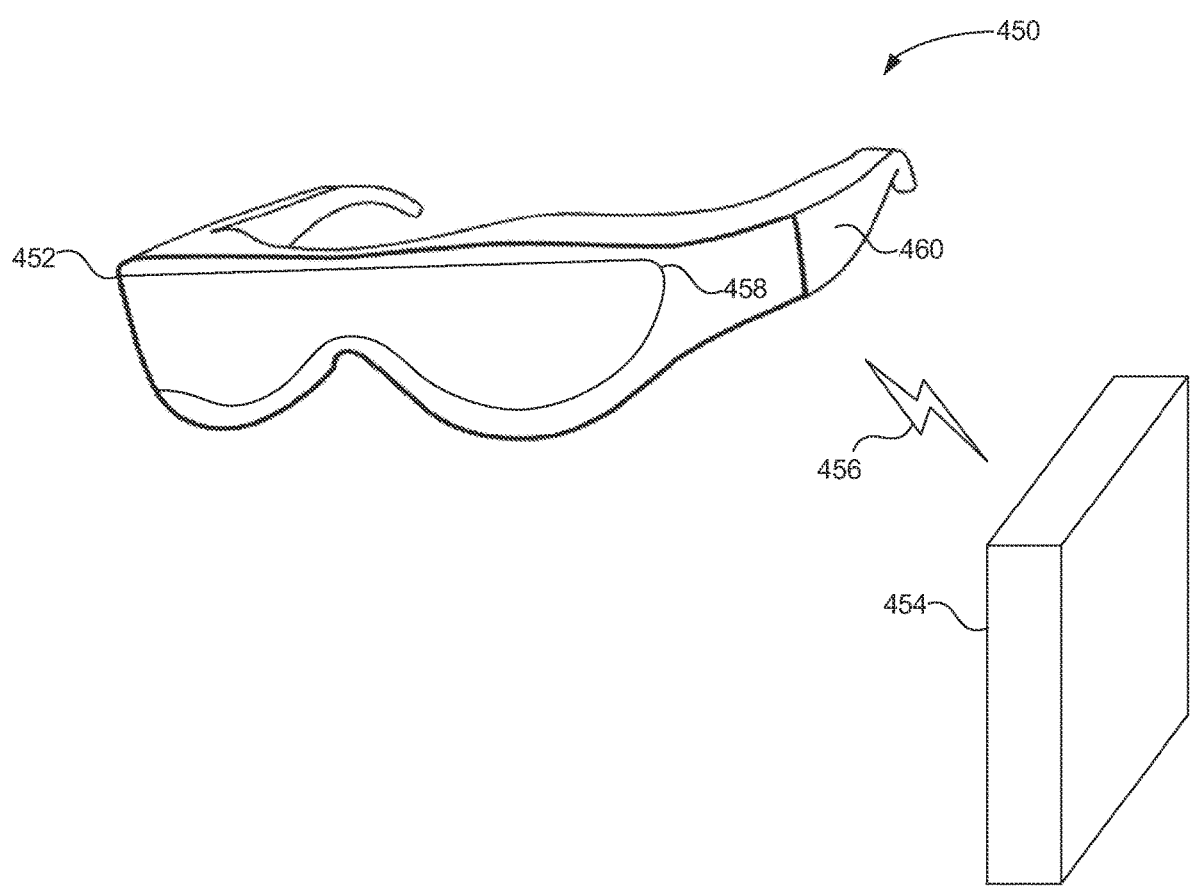
FIG. 4B is a wire diagram of a mixed reality HMD system which includes a mixed reality HMD and a core processing component, according to certain aspects of the disclosure.

FIG. 4B is a wire diagram of a mixed reality HMD system 450 which includes a mixed reality HMD 452 and a core processing component 454, according to certain aspects of the disclosure. The mixed reality HMD 452 and the core processing component 454 can communicate via a wireless connection (e.g., a 60 GHz link) as indicated by link 456. In other implementations, the mixed reality system 450 includes a headset only, without an external compute device or includes other wired or wireless connections between the mixed reality HMD 452 and the core processing component 454. The mixed reality HMD 452 includes a pass-through display 458 and a frame 460. The frame 460 can house various electronic components (not shown) such as light projectors (e.g., LASERs, LEDs, etc.), cameras, eye-tracking sensors, MEMS components, networking components, etc.

The projectors can be coupled to the pass-through display 458, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 454 via link 456 to HMD 452. Controllers in the HMD 452 can convert the image data into light pulses from the projectors, which can be transmitted via the optical elements as output light to the user's eye. The output light can mix with light that passes through the display 458, allowing the output light to present virtual objects that appear as if they exist in the real world.

Similarly to the HMD 400, the HMD system 450 can also include motion and position tracking units, cameras, light sources, etc., which allow the HMD system 450 to, e.g., track itself in 3DoF or 6DoF, track portions of the user (e.g., hands, feet, head, or other body parts), map virtual objects to appear as stationary as the HMD 452 moves, and have virtual objects react to gestures and other real-world objects.

The disclosed system(s) address a problem in traditional artificial reality environment generation techniques tied to computer technology, namely, the technical problem of artificial reality environments that are standardized across all users may fail to fully engage users by not fully appealing to their preferences. The disclosed system solves this technical problem by providing a solution also rooted in computer technology, namely, by providing for auto-generating an artificial reality environment based on access to personal user content. The disclosed subject technology further provides improvements to the functioning of the computer itself because it improves processing and efficiency in generating an artificial reality environment.

Figure 5:
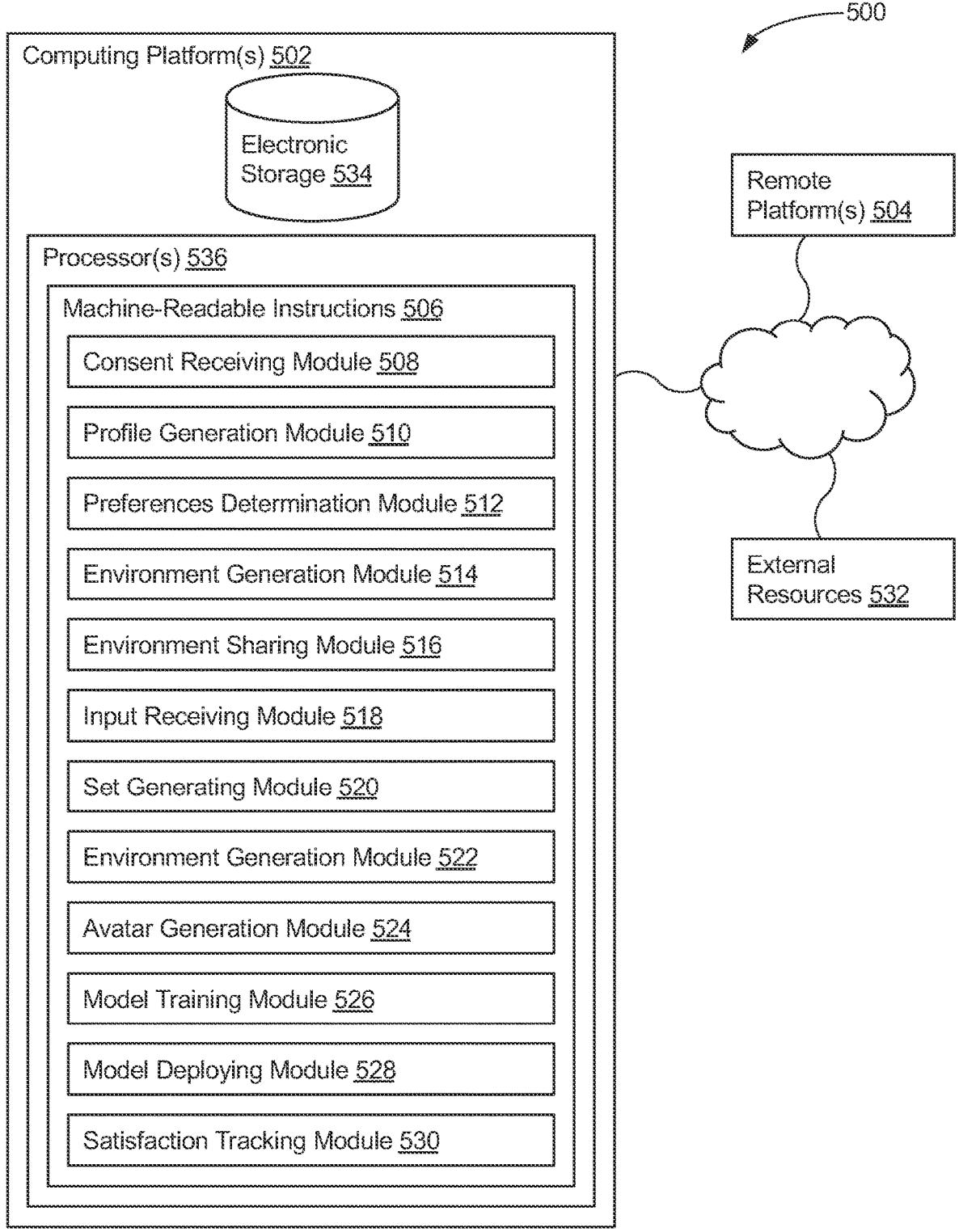
FIG. 5 illustrates a system configured for generating an artificial reality environment, in accordance with one or more implementations.

FIG. 5 illustrates a system 500 configured for generating an artificial reality environment, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of consent receiving module 508, profile generation module 510, preferences determination module 512, environment generation module 514, environment sharing module 516, input receiving module 518, set generating module 520, environment generation module 522, avatar generation module 524, model training module 526, model deploying module 528, satisfaction tracking module 530, and/or other instruction modules.

Consent receiving module 508 may be configured to receive consent from a user to access user content on a user device. The user content may include digital media. By way of non-limiting example, the digital media may include one or more of photos, videos, messages, emails, calendar, social media posts, and/or activities. The user content may include personal content of the user. The personal content may include content that is accessible to the user and inaccessible to other users. The consent may be categorical consent associated with a first category of user content. The categorical consent may allow access to a group of user content within the first category. By way of non-limiting example, the user device may include one or more of an artificial reality headset, a smartphone, a tablet, a computer, and/or a laptop.

By way of non-limiting example, the user content may include one or more of a past photo, a past experience of the user, relationships of the user, experiences shared between the user and at least one other user, or preferences of the user. The past photo may include a preexisting digital image associated with the user. By way of non-limiting example, the past photo may be associated with the user through one or more of the past photo being posted by the user to social media, the past photo being saved to a user profile, and/or the user being tagged in the past photo by another user. The past experience of the user may include one or both of a past real-world experience and/or a past experience in an artificial reality environment. The relationships of the user may include one or both of real-world relationships of the user and/or relationships within a social media platform. The experiences shared between the user and the at least one other user may include one or both of a shared real-world experience and/or a shared experience in an artificial reality environment. The preference of the user may include one or both of a preference explicitly indicated by the user or an inferred preference.

Profile generation module 510 may be configured to generate a user profile based at least in part on the user content. The user profile may be generated through accessing the user content. Generating the user profile through accessing the user content may include identifying user content based on recency and/or a preference of the user breaching a threshold.

Preferences determination module 512 may be configured to determine user preferences based at least in part on the user profile. By way of non-limiting example, the user preferences may relate to one or more of food preferences, music preferences, travelling preferences, favorite places visited, preferences for specific types of activities, and/or preferences associated with contacts.

Environment generation module 514 may be configured to generate an artificial reality environment based at least in part on the user preferences. FIG. 2, above, provides one illustrative example. Environment sharing module 516 may be configured to share the artificial reality environment with contacts of the user. The sharing may be via and/or based on a social graph.

Input receiving module 518 may be configured to receive a text input. The text input may be provided via one or more of a user interface, a user headset, a voice to text process, a text message, and/or other types of text input. The text input may be a basis for autogenerating the artificial reality environment. Set generating module 520 may be configured to generate a set of images based on the text input. Subject matter of the set of images may relate to subject matter of the text input.

Environment generation module 522 may be configured to generate the artificial reality environment based at least in part on the set of images. The artificial reality environment may be explored with the contacts of the user. One or both of photos and/or videos may be utilized to generate the artificial reality environment. The artificial reality environment may include real-world places and/or fictional places. By way of non-limiting example, the real-world places may include one or more of great pyramids, planets, national parks, cities, sports stadiums, and/or event venues. By way of non-limiting example, the fictional places include one or more of a fictional location featured in a movie, a fictional location featured in a book, a fictional location featured in a television series, a fictional location featured in a video game, and/or a fictional location featured in a blog. By way of non-limiting example, the fictional places may include one or more of a location featured in Star Wars, a location featured in Harry Potter, a location featured in Super Mario Brothers, a location featured in Chronicles of Narnia, a location featured in the Avatar movie, and/or a location featured in Sesame Street.

The artificial reality environment may include a mind palace. By way of non-limiting example, the mind palace may be configured to allow individual users to organize one or more of thoughts, ideas, and/or concepts by way of different autogenerated artificial reality environments. The mind palace could also organize other things such as reminders, important dates (e.g., birthdays, etc.), notes, and other important information. In this way, instead of organizing things in folders on a computer, a user can organize that same information in a 3D format in a virtual room/virtual world.

Avatar generation module 524 may be configured to generate a virtual avatar for the artificial reality environment. The virtual avatar may include a person or an object. The virtual avatar may represent the user in the artificial reality environment. The virtual avatar may represent another user in the artificial reality environment. An appearance of the avatar may relate to the user content. The artificial reality environment may include educational material.

According to aspects, a default avatar may be generated based on the virtual environment. The user may then further customize the avatar by giving the avatar additional details. The avatar may be completely randomly generated as well. In an implementation, an avatar may have one HULK foot, one duck foot, one skeleton arm, one WONDER WOMAN arm, a lion's head for a head, a human torso, a crown (or any accessory, etc.) on the head, the head may also have horns, etc., based on their preference.

According to aspects, avatars may be auto-generated using AI/ML. For example, avatars may be generated based on user content to create a more realistic depiction of the person. In an implementation, a user's fashion style can be implied from a user's data.

Model training module 526 may be configured to train a machine learning (ML) model to determine the user preferences. The ML model may be used to analyze user media and/or other information to determine the user preferences. Model deploying module 528 may be configured to deploy the ML model to auto-generate the artificial reality environment.

Satisfaction tracking module 530 may be configured to track satisfaction of the user with the artificial reality environment to generate better artificial reality environments that better fit the user. Satisfaction may be utilized to optimize future-generated artificial reality environments according to user preferences.

According to aspects, user satisfaction may be determined by an amount of time that the user is spending in the environment, implementing a sentiment analysis model on what the user is saying that depicts whether users satisfied by what was generated, looking at indications on how much manual changes users are implementing after the auto generation is complete, and/or user feedback, etc. Additionally, a survey may be utilized to ask users what could be improved. User research sessions may also be utilized to understand how to better serve users.

In some implementations, computing platform(s) 502, remote platform(s) 504, and/or external resources 532 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 532 may be operatively linked via some other communication media.

A given remote platform 504 may include one or more processors configured to execute computer program modules. The computer program modules may be configured to enable an expert or user associated with the given remote platform 504 to interface with system 500 and/or external resources 532, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 532 may include sources of information outside of system 500, external entities participating with system 500, and/or other resources. In some implementations, some or all of the functionality attributed herein to external resources 532 may be provided by resources included in system 500.

Computing platform(s) 502 may include electronic storage 534, one or more processors 536, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 534 may comprise non-transitory storage media that electronically stores information. The electronic storage media of electronic storage 534 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 534 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 534 may include one or more virtual storage resources (e.g., cloud storage, a virtual private network, and/or other virtual storage resources). Electronic storage 534 may store software algorithms, information determined by processor(s) 536, information received from computing platform(s) 502, information received from remote platform(s) 504, and/or other information that enables computing platform(s) 502 to function as described herein.

Processor(s) 536 may be configured to provide information processing capabilities in computing platform(s) 502. As such, processor(s) 536 may include one or more of a digital processor, an analog processor, a digital circuit designed to process information, an analog circuit designed to process information, a state machine, and/or other mechanisms for electronically processing information. Although processor(s) 536 is shown in FIG. 5 as a single entity, this is for illustrative purposes only. In some implementations, processor(s) 536 may include a plurality of processing units. These processing units may be physically located within the same device, or processor(s) 536 may represent processing functionality of a plurality of devices operating in coordination. Processor(s) 536 may be configured to execute modules 508, 510, 512, 514, 516, 518, 520, 522, 524, 526, 528, and/or 530, and/or other modules. Processor(s) 536 may be configured to execute modules 508, 510, 512, 514, 516, 518, 520, 522, 524, 526, 528, and/or 530, and/or other modules by software; hardware; firmware; some combination of software, hardware, and/or firmware; and/or other mechanisms for configuring processing capabilities on processor(s) 536. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, 526, 528, and/or 530 are illustrated in FIG. 5 as being implemented within a single processing unit, in implementations in which processor(s) 536 includes multiple processing units, one or more of modules 508, 510, 512, 514, 516, 518, 520, 522, 524, 526, 528, and/or 530 may be implemented remotely from the other modules. The description of the functionality provided by the different modules 508, 510, 512, 514, 516, 518, 520, 522, 524, 526, 528, and/or 530 described below is for illustrative purposes, and is not intended to be limiting, as any of modules 508, 510, 512, 514, 516, 518, 520, 522, 524, 526, 528, and/or 530 may provide more or less functionality than is described. For example, one or more of modules 508, 510, 512, 514, 516, 518, 520, 522, 524, 526, 528, and/or 530 may be eliminated, and some or all of its functionality may be provided by other ones of modules 508, 510, 512, 514, 516, 518, 520, 522, 524, 526, 528, and/or 530. As another example, processor(s) 536 may be configured to execute one or more additional modules that may perform some or all of the functionality attributed below to one of modules 508, 510, 512, 514, 516, 518, 520, 522, 524, 526, 528, and/or 530.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
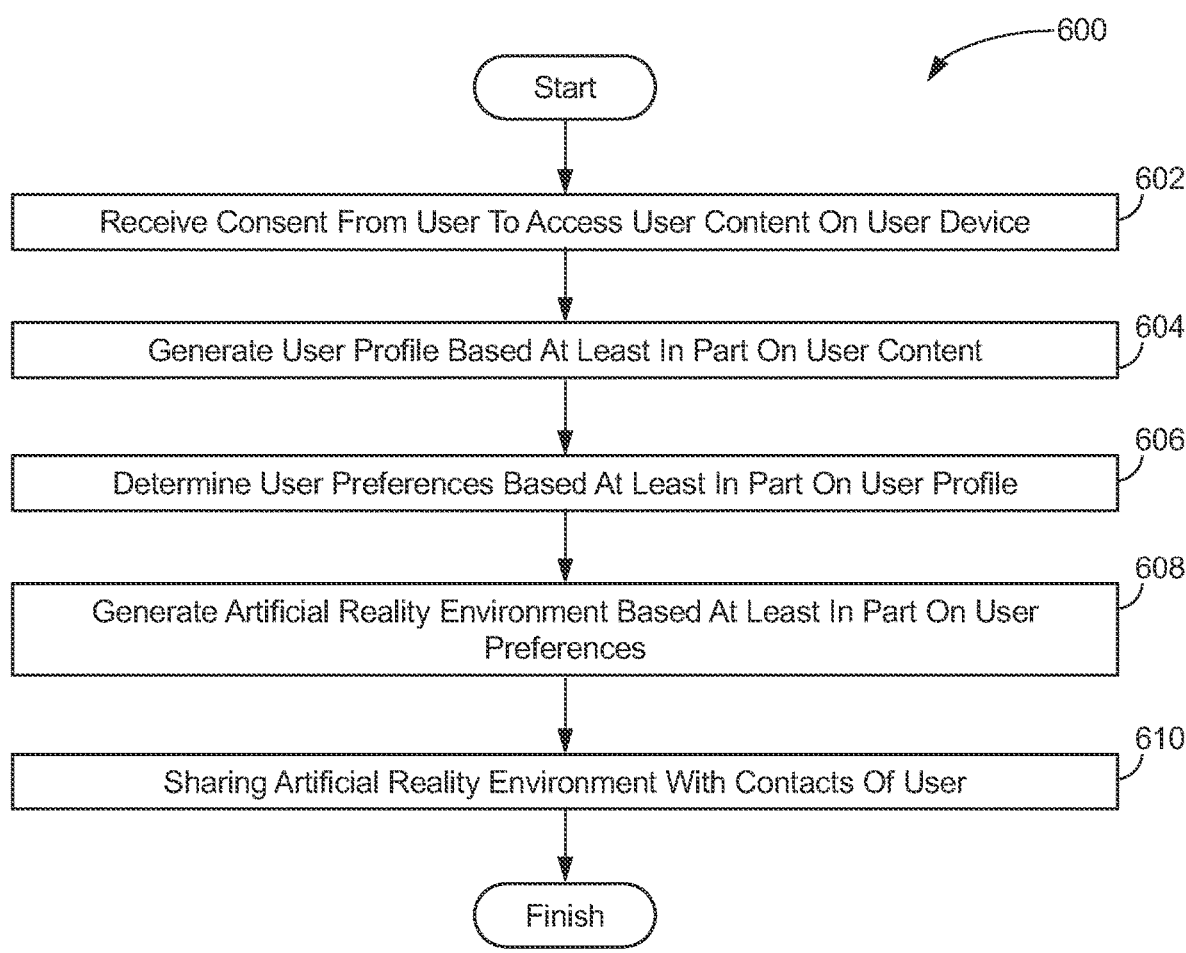
FIG. 6 illustrates an example flow diagram for generating an artificial reality environment, according to certain aspects of the disclosure.

FIG. 6 illustrates an example flow diagram (e.g., process 600) for generating an artificial reality environment, according to certain aspects of the disclosure. For explanatory purposes, the example process 600 is described herein with reference to FIGS. 1-5. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-5.

At a step 602, the process 600 may include receiving consent from a user to access user content on a user device. The user content may include digital media. In an aspect, the user content may be utilized to search a dataset of images and videos for related content. At a step 604, the process 600 may include generating a user profile is based at least in part on the user content and other related content from the dataset. At a step 606, the process 600 may include determining user preferences based at least in part on the user profile. At a step 608, the process 600 may include generating an artificial reality environment based at least in part on the user preferences. At a step 610, the process 600 may include sharing the artificial reality environment with contacts of the user.

For example, as described above in relation to FIGS. 1-5, at a step 602, the process 600 may include receiving consent from a user to access user content on a user device. The user content may include digital media. At a step 604, the process 600 may include generating a user profile based at least in part on the user content, through profile generation module 510. At a step 606, the process 600 may include determining user preferences based at least in part on the user profile through preferences determination module 512. At a step 608, the process 600 may include generating an artificial reality environment based at least in part on the user preferences, through environment generation module 514. At a step 610, the process 600 may include sharing the artificial reality environment with contacts of the user, through environment sharing module 516.

According to an aspect, the digital media comprises one or more of photos, videos, messages, emails, calendar, social media posts, and/or activities.

According to an aspect, the user content comprises personal content of the user.

According to an aspect, the user device comprises one or more of an artificial reality headset, a smartphone, a tablet, a computer, and/or a laptop.

According to an aspect, the consent is categorical consent associated with a first category of user content.

According to an aspect, the user preferences relate to one or more of food preferences, music preferences, travelling preferences, favorite places visited, preferences for specific types of activities, and/or preferences associated with contacts.

According to an aspect, the user profile is generated through accessing the user content.

According to an aspect, the process 600 further includes receiving a text or voice input.

According to an aspect, the process 600 further includes generating a set of images based on the text input.

According to an aspect, the process 600 further includes generating the artificial reality environment based at least in part on the set of images.

According to an aspect, one or both of photos and/or videos are utilized to generate the artificial reality environment.

According to an aspect, the sharing is via and/or based on a social graph.

According to an aspect, the artificial reality environment comprises a mind palace, the mind palace being configured to allow individual users to organize one or more of thoughts, ideas, and/or concepts by way of different auto-generated artificial reality environments.

According to an aspect, the artificial reality environment comprises real-world places and/or fictional places.

According to an aspect, the artificial reality environment is explored with the contacts of the user.

According to an aspect, the process 600 further includes generating a virtual avatar for the artificial reality environment.

According to an aspect, the virtual avatar comprises a person or an object.

According to an aspect, the process 600 further includes training a machine learning (ML) model to determine the user preferences.

According to an aspect, the process 600 further includes deploying the ML model to auto-generate the artificial reality environment.

Figure 7:
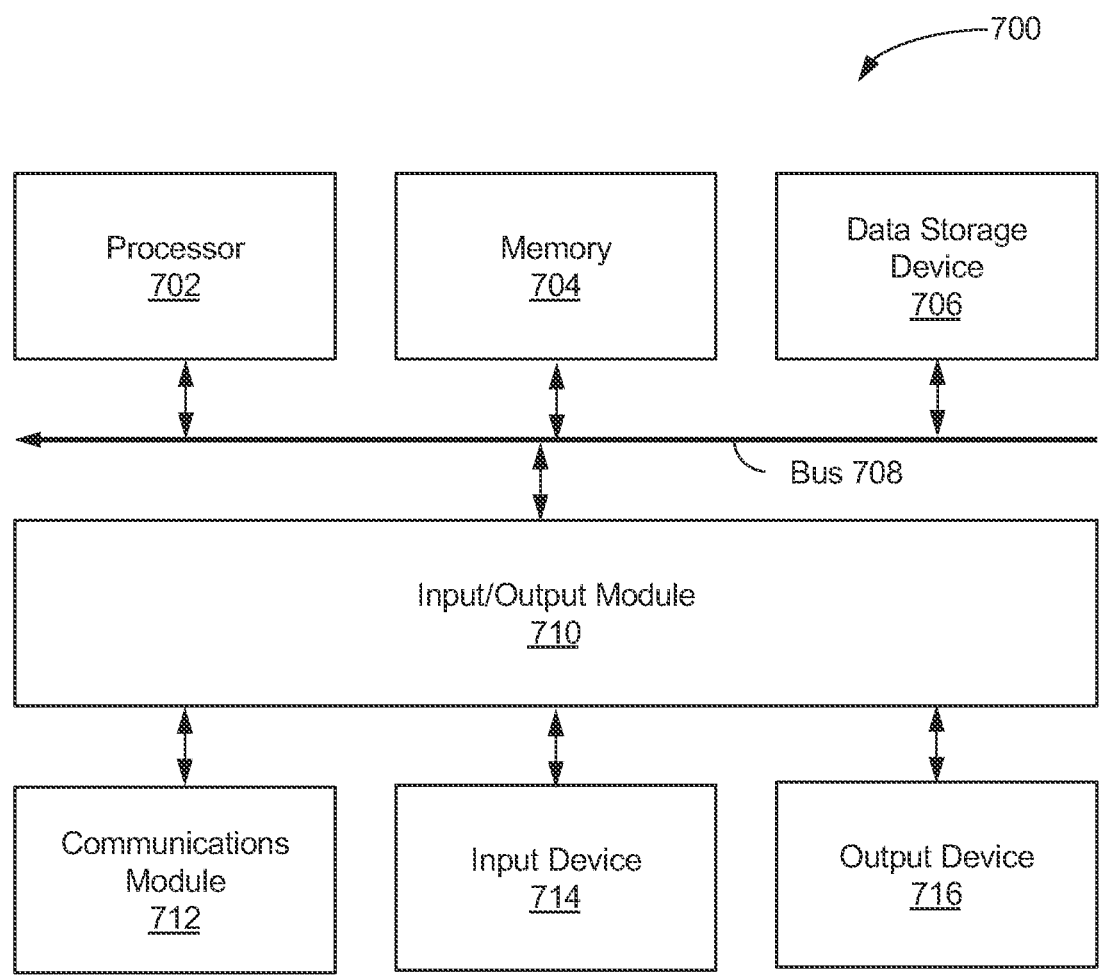
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for sharing artificial reality content, comprising:
    receiving, at a user device, a text or voice input;
    accessing a set of images on the user device based on the text or voice input;
    obtaining, using an assistant system, information used to present a user-specific avatar for a first user of the user device and a background theme for the user-specific avatar based at least in part on the set of images and user preferences associated with the first user; and
    in accordance with a determination that the user-specific avatar and the background theme for the user-specific avatar should be shared with other specific users:
        providing the information used to present the user-specific avatar and the background theme for the user-specific avatar to a second user associated with the first user, wherein:
            the set of images correspond to one or more of a shared real-world experience and a shared experience in an artificial reality environment between the first user and the second user.

2. The computer-implemented method of claim 1, further comprising:
    obtaining, using the assistant system, information used to present a representation of the set of images based at least in part on the set of images and user preferences associated with the first user; and
    in accordance with the determination that the user-specific avatar and the background theme for the user-specific avatar should be shared with the other specific users:
        providing the information used to present the representation of the set of images to the second user.

3. The computer-implemented method of claim 1, wherein, the information used to present the user-specific avatar and the background theme for the user-specific avatar comprises information that, when rendered on an artificial reality headset, produces a three-dimensional effect perceived by the second user.

4. The computer-implemented method of claim 1, wherein providing the information used to present the user-specific avatar and the background theme for the user-specific avatar includes providing at least one of the shared real-world experience and the shared experience in the artificial reality environment.

5. The computer-implemented method of claim 1, further comprising:
in accordance with the determination that the user-specific avatar and the background theme for the user-specific avatar should be shared with other specific users:
providing the information used to present the user-specific avatar and the background theme for the user-specific avatar to a third user associated with the first user, wherein:
the set of images correspond to one or more of another shared real-world experience and another shared experience in another artificial reality environment between the first user and the third user.

6. The computer-implemented method of claim 1, further comprising determining the user preferences based at least in part on user content on the user device, wherein the user preferences relate to one or more of food preferences, music preferences, travelling preferences, favorite places visited, preferences for specific types of activities, fashion style, and/or preferences of the second user.

7. The computer-implemented method of claim 1, wherein the information used to present the user-specific avatar and the background theme for the user-specific avatar is provided to the second user via and/or based on a social graph.

8. The computer-implemented method of claim 1, wherein the second user is a contact of the first user on the user device.

9. The computer-implemented method of claim 1, wherein obtaining the background theme for the user-specific avatar based at least in part on the set of images and user preferences associated with the first user comprises:
identifying a plurality of background themes based at least in part on the set of images; and
selecting, via a recommendation engine, the background theme based on personal information of the first user.

10. The computer-implemented method of claim 1, wherein a machine learning (ML) model is used to obtain the information used to present the user-specific avatar and the background theme for the user-specific avatar.

11. The computer-implemented method of claim 1, wherein the user device comprises an artificial reality headset, a smartphone, a tablet, a computer, and/or a laptop.

12. The computer-implemented method of claim 1, wherein the set of images are captured by a camera disposed on the user device.

13. A system configured for sharing artificial reality content, comprising:
one or more processors; and
a memory storing instructions which, when executed by the one or more processors, cause the system to:
receive, at a user device, a text or voice input;
access a set of images on the user device based on the text or voice input;
obtain, using an assistant system, information used to present a user-specific avatar for a first user of the user device and a background theme for the user-specific avatar based at least in part on the set of images and user preferences associated with the first user; and
in accordance with a determination that the user-specific avatar and the background theme for the user-specific avatar should be shared with other specific users:
provide the information used to present the user-specific avatar and the background theme for the user-specific avatar to a second user associated with the first user, wherein:
the set of images correspond to one or more of a shared real-world experience and a shared experience in an artificial reality environment between the first user and the second user.

14. The system of claim 13, wherein, the information used to present the user-specific avatar and the background theme for the user-specific avatar comprises information that, when rendered on an artificial reality headset, produces a three-dimensional effect perceived by the second user.

15. The system of claim 13, wherein providing the information used to present the user-specific avatar and the background theme for the user-specific avatar includes providing at least one of the shared real-world experience and the shared experience in the artificial reality environment.

16. The system of claim 13, wherein the instructions further cause the system to:
in accordance with the determination that the user-specific avatar and the background theme for the user-specific avatar should be shared with other specific users:
provide the information used to present the user-specific avatar and the background theme for the user-specific avatar to a third user associated with the first user, wherein:
the set of images correspond to one or more of another shared real-world experience and another shared experience in another artificial reality environment between the first user and the third user.

17. A non-transient computer-readable storage medium having instructions embodied thereon for sharing artificial reality content, the instructions, when executed by one or more processors, cause a computer system to:
receive, at a user device, a text or voice input;
access a set of images on the user device based on the text or voice input;
obtain, using an assistant system, information used to present a user-specific avatar for a first user of the user device and a background theme for the user-specific avatar based at least in part on the set of images and user preferences associated with the first user; and
in accordance with a determination that the user-specific avatar and the background theme for the user-specific avatar should be shared with other specific users:
provide the information used to present the user-specific avatar and the background theme for the user-specific avatar to a second user associated with the first user, wherein:
the set of images correspond to one or more of a shared real-world experience and a shared experience in an artificial reality environment between the first user and the second user.

18. The non-transient computer-readable storage medium of claim 17, wherein, the information used to present user-specific avatar and the background theme for the user-specific avatar comprises information that, when rendered on an artificial reality headset, produces a three-dimensional effect perceived by the second user.

19. The non-transient computer-readable storage medium of claim 17, wherein providing the information used to present the user-specific avatar and the background theme for the user-specific avatar includes providing at least one of the shared real-world experience and the shared experience in the artificial reality environment.

20. The non-transient computer-readable storage medium of claim 17, wherein the instructions further cause the computer system to:

in accordance with the determination that the user-specific avatar and the background theme for the user-specific avatar should be shared with other specific users:
provide the information used to present the user-specific avatar and the background theme for the user-specific avatar to a third user associated with the first user, wherein:
the set of images correspond to one or more of another shared real-world experience and another shared experience in another artificial reality environment between the first user and the third user.

\* \* \* \* \*